US008804958B2

(12) United States Patent
Gudenus et al.

(10) Patent No.: US 8,804,958 B2
(45) Date of Patent: Aug. 12, 2014

(54) METHOD FOR PROTECTING DATA CONTENT

(75) Inventors: Gabriel Gudenus, Vienna (AT); Gerald Schreiber, Wentorf (DE)

(73) Assignee: Siemens Convergence Creators GmbH, Vienna (AT)

( * ) Notice: Subject to any disclaimer, the term of this patent is extended or adjusted under 35 U.S.C. 154(b) by 0 days.

(21) Appl. No.: 13/569,625

(22) Filed: Aug. 8, 2012

(65) Prior Publication Data
US 2013/0205411 A1 Aug. 8, 2013

(30) Foreign Application Priority Data
Aug. 22, 2011 (EP) .................................... 11178244

(51) Int. Cl.
*H04N 7/167* (2011.01)
*G11B 20/00* (2006.01)

(52) U.S. Cl.
CPC ................................ *G11B 20/00826* (2013.01)
USPC ........... 380/252; 380/200; 380/201; 380/204; 380/287; 455/431; 726/26; 726/27; 725/75; 725/76; 725/87; 370/527; 370/529; 713/150; 713/176; 713/189

(58) Field of Classification Search
CPC ..................... G11B 20/0021; G11B 20/00826; G11B 20/00188; G11B 20/00884; H04N 21/2146
USPC .................................................. 380/200–201
See application file for complete search history.

(56) References Cited

U.S. PATENT DOCUMENTS

| 3,963,865 | A  | * | 6/1976  | Songer ........................... 380/204 |
| 4,086,634 | A  | * | 4/1978  | Cook ............................... 705/58 |
| 5,822,360 | A  | * | 10/1998 | Lee et al. ....................... 375/140 |
| 6,246,439 | B1 | * | 6/2001  | Zink et al. ..................... 348/473 |
| 6,950,520 | B1 | * | 9/2005  | Ryan et al. ..................... 380/200 |
| 7,343,157 | B1 | * | 3/2008  | Mitchell ........................ 455/431 |
| 2002/0097870 | A1 | * | 7/2002 | Nelson .......................... 380/201 |
| 2003/0208764 | A1 | * | 11/2003 | Galipeau et al. ................ 725/76 |
| 2004/0049392 | A1 |   | 3/2004  | Yamada |
| 2005/0033579 | A1 | * | 2/2005  | Bocko et al. .................. 704/273 |
| 2005/0053237 | A1 | * | 3/2005  | Hanson .......................... 380/201 |
| 2005/0216938 | A1 | * | 9/2005  | Brady et al. .................... 725/76 |
| 2005/0273862 | A1 | * | 12/2005 | Benaloh et al. ................ 726/26 |
| 2007/0044126 | A1 | * | 2/2007  | Mitchell ......................... 725/81 |

(Continued)

FOREIGN PATENT DOCUMENTS

EP            1169707 A1    1/2002

OTHER PUBLICATIONS

Poulami Dutta et al., Data Hiding in Audio Signal: A Review, in 2 International Journal of Database Theory and Application No. 2 (2009).*

(Continued)

*Primary Examiner* — Morshed Mehedi
*Assistant Examiner* — Sharon Lynch

(57) ABSTRACT

A method is provided for protecting data content against illegal copying. The data content is provided by an entertainment system and is output to output units in an authorized playback environment for playing back the data content. The method includes transmitting the data content in the authorized playback environment from the entertainment system to an output unit, and adding an interference signal to the data content such that, during playback of the data content outside the authorized playback environment a disruption is induced.

10 Claims, 1 Drawing Sheet

(56) References Cited

U.S. PATENT DOCUMENTS

| | | | |
|---|---|---|---|
| 2007/0180254 A1* | 8/2007 | Schumann et al. | 713/176 |
| 2007/0263085 A1* | 11/2007 | Marton et al. | 348/14.09 |
| 2008/0089202 A1* | 4/2008 | Robinson et al. | 369/53.21 |
| 2008/0273744 A1* | 11/2008 | Kogure et al. | 382/100 |
| 2008/0318640 A1* | 12/2008 | Takano et al. | 455/569.1 |
| 2009/0058682 A1* | 3/2009 | True | 340/971 |
| 2009/0097681 A1* | 4/2009 | Puria et al. | 381/318 |
| 2009/0113200 A1* | 4/2009 | Van Wie et al. | 713/150 |
| 2011/0081026 A1* | 4/2011 | Ramakrishnan et al. | 381/94.3 |
| 2011/0246202 A1* | 10/2011 | McMillan et al. | 704/270 |
| 2011/0264923 A1* | 10/2011 | Kocher et al. | 713/189 |
| 2012/0250879 A1* | 10/2012 | Moody | 381/86 |

OTHER PUBLICATIONS

K. Gopal Gopalan et al., Data Embedding in Audio Signals, in 6 IEEE Proceedings of Aerospace Conference 2713-2720 (2001).*
Motion picture association of america, "Types of content theft"; http://www.mpaa.org/contentprotection/types-of-content-theft; Others.

* cited by examiner

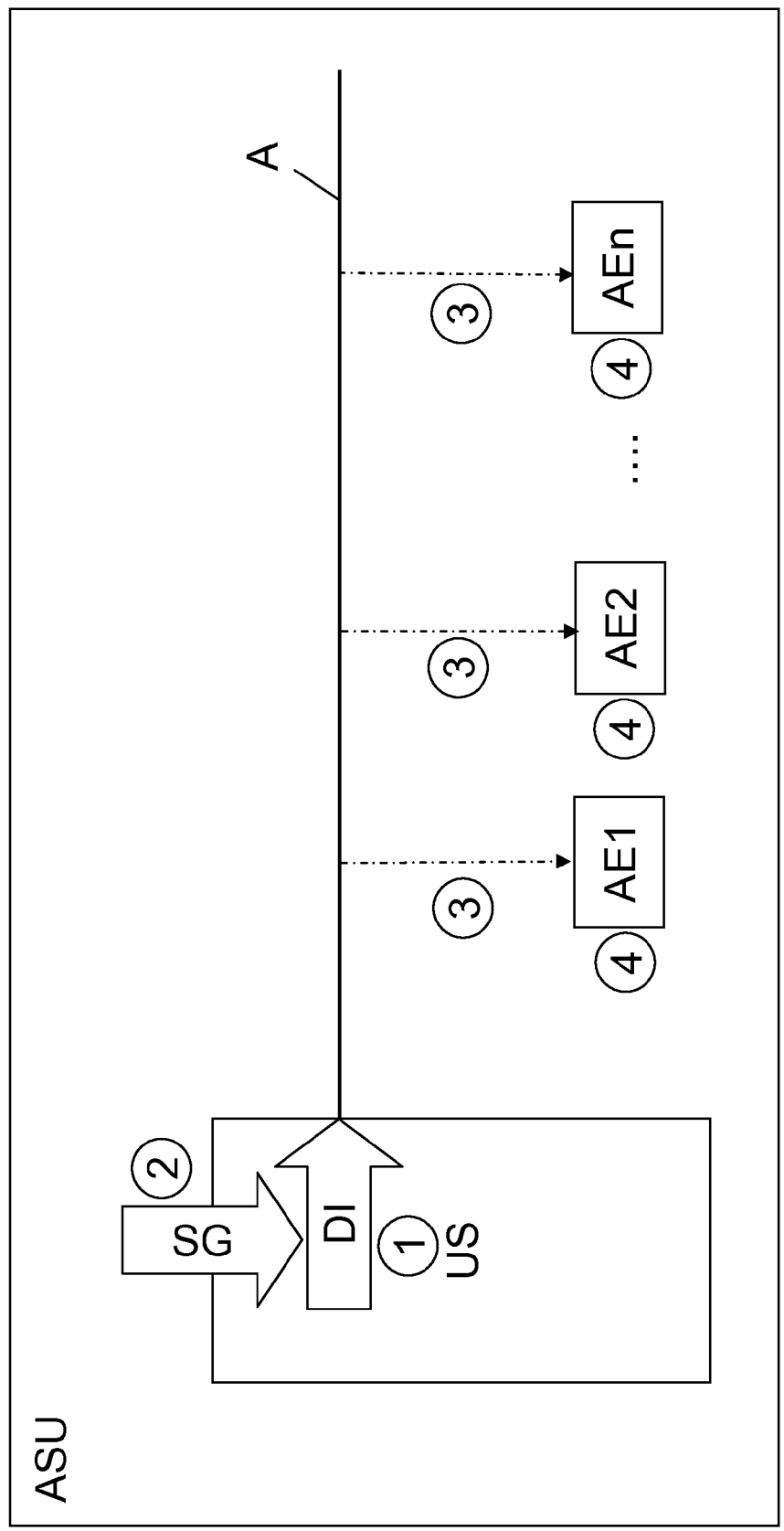

METHOD FOR PROTECTING DATA CONTENT

CROSS REFERENCE TO RELATED APPLICATIONS

This application claims priority of European Patent Office application No. 11178244.7 EP filed Aug. 22, 2011. All of the applications are incorporated by reference herein in their entirety.

FIELD OF INVENTION

The illustrated embodiments relate to protection of data content, particularly audio and/or video data content, from illegal copying. In this case the data content of an entertainment system is made available in an authorized playback environment and can be output to or played back on output units in the authorized playback environment.

BACKGROUND OF INVENTION

In commercial entertainment systems, which are used in aircraft for example for on-board entertainment, as a result of a protected architecture, for example by building output units into the seats and/or protected networks which are only accessible to specific technicians and engineers, very high-quality data content can be provided. This type of data content is for example audio and/or video content (e.g. music clips, films, series etc.), which is shown in an airline hospitality window, e.g. is shown to the passengers during flights. This means that the data content is already provided on these types of entertainment system in aircraft even before it appears on the market, e.g. on a DVD etc. or very shortly after its release in the cinema for example.

The trend in the market of switching from permanently installed output units (e.g. screens etc.) in entertainment systems to personal entertainment devices (PED) such as smart phones, tablet PCs and/or laptops for example, or of making the content of entertainment systems directly accessible to a user's terminal, means that the high-quality data content is no longer protected by a restricted system architecture of the entertainment system for example. This can result in owners of the data content or owners of rights to the data content (e.g. film studios, rental companies, etc.) only reluctantly wanting or even not wanting at all to make it available in an airline hospitality window. To also enable the highest possible quality data content such as audio and/or video content for example to continue to be offered it will thus become necessary to find new or alternate protection mechanisms which make availability possible on personal entertainment devices as output units but also provide protection against unauthorized copying and/or playback.

In today's entertainment systems protection of the data content is provided by a complete isolation of the networks and servers, which are only accessible to authorized personnel or authorized technicians for example. The data content is output and displayed for example on in-flight entertainment systems on output units attached to the roof of the cabin or built into the seat. Output to personal entertainment devices or private mobile terminals of the users such as smart phones, tablet PCs etc. is not possible in any event on the systems. This means however that these systems are relatively inflexible and display of the data content is linked to one seat in the aircraft for example.

If personal entertainment devices or mobile terminals are used as output units various methods and widely used protection mechanisms have become available in the interim to protect against unauthorized usage (e.g. playing, copying, etc.). Such already widely used protection mechanisms are e.g. Digital Rights Management (encryption), conditional access, (seat-based) watermarking or identification by means of what are known as digital watermarks, client hardening, deactivation of video outputs etc.

Digital Rights Management (DRM) is to be understood as methods and/or systems with which use or if necessary also distribution of digital content can be controlled. Digital Rights Management (DRM) or secure use is employed above all with audio and/or video data content but also with software, electronic documents and/or electronic books. DRM makes it possible for providers of data content to carry out usage control for their data content, principally by developing new payment options (e.g. granting of licenses, authorizations etc.) and thus allowing billing for usage rights to data content instead of the data content itself.

This enables the use of data content to be restricted to a usage agreement made previously for example. With DRM for example audio and/or video data content etc. is encrypted before digital transmission to an output unit. I.e. the data stream for the transmission of the data content is encrypted by the DRM system. The encrypted data stream is then transmitted to the output unit and then directly decrypted on the output unit of the respective users if they have the corresponding authorizations and/or checking of the authorizations by the DRM system etc. However a disadvantage of Digital Rights Management is that, for further presentation of the data content on the output unit, the data content must be available completely unencrypted. In such cases there is then the danger of the data content (e.g. video content before availability on DVDs etc.) e.g. during the reproduction on the output unit for example being (digitally) filmed or copied and thus being able to be used again contrary to the usage agreement.

So-called conditional access or an access system is a method of protection for data content in which specific criteria must be complied with, before access to the data content is provided. Conditional Access is for example frequently used in the area of digital television, especially with pay-per-view satellite TV broadcasters (so-called pay-TV). Thus in the common access method used for digital television, by which the data content is encrypted and decrypted, a continuously changing control word is used, through which the data content can be decrypted on the receiver side. This control word is made available by a common-access system to an authorized output unit and makes sure that only defined recipients or output units will be addressed and receive the control word. On the receiver side or the output side a user-independent conditional access module and a user-dependent smartcard are usually used in the output unit. Thus conditional access—especially in conjunction with entertainment systems in aircraft for example—usually have a disadvantage of the terminals having to be equipped with additional units such as common access modules and smartcards for example. In addition these devices do not prevent the user copying or storing the data content as soon as this is encrypted on the respective output unit.

A further option for protecting data content is what is known as digital watermarking. With this method imperceptible markings are usually recorded in the carrier media of the data content, such as images, videos, 3D data, audio material and/or texts for example. These digital watermarks can then be read out by means of computer-based methods and used for various purposes (e.g. tracing owner rights violations, verification of data integrity and/or authenticity, etc.) However the disadvantage of digital watermarking is that it does not represent a direct protection mechanism for the data content. It only allows owner rights violations to be proved and/or possible illegal copies of data content or the playback thereof to be identified.

Client hardening usually involves an output unit such as a client for example, from which contact is made in a computer system with a server in order to obtain data content, applications and/or services from this server to protect against unauthorized manipulations (e.g. installation or de-installation of client software, applications, protected services and/or data content etc.). In an output unit for which client hardening has been employed a change to the software and/or data contents (e.g. deletion, copying, etc.) can now only be carried out by authorized persons (e.g. administrator etc.). No further changes and/or manipulation can be performed by unauthorized persons at this output unit, e.g. to the configured protection facilities and/or the software. However the disadvantage of client hardening is that an authorized administrator must always be available for creation of new data content for example and/or for changes. Thus client hardening—especially in the area of entertainment systems—is relatively complex and cost-intensive and also inflexible, since for example private terminals of a user cannot be used as an output unit.

Furthermore unauthorized copying of data content made available can also be prevented by deactivation of video outputs, of the output unit for example. However this deactivation must be carried out at each output device before it is used. In addition this does not prevent the data content being filmed or recorded directly from the output unit by means of a recording device (e.g. camera, smart phone, etc.) and then for example played back or duplicated in an unauthorized manner.

SUMMARY OF INVENTION

An object of the illustrated embodiments is thus to specify a method for protecting data content against illegal copying through which, in a simple, flexible and low-cost manner, unauthorized copying and/or duplication of data content is prevented and conventional protection mechanisms are expanded or improved by a further level of protection for any given output units.

The above objects are achieved by the features of the independent claim(s). Specific embodiments of the method are described in the dependent claims.

In accordance with the illustrated embodiments, there is provision for data content which is made available by an entertainment system to be transferred in an authorized playback environment to output units located in this playback environment. An interference signal is inserted into the data content such that, if the data content is played back outside the authorized playback environment, a disruption is induced.

An aspect of the illustrated embodiments lies in making use of the fact in the illustrated method that during playback of data content, especially during playback of audio data content or of an audio component of the data content (e.g. video data content, etc.), the starting point is always ideal ambient conditions. This means existing ambient noise and/or disruptions are not taken into account by the playback environment for instance. When the data content is played back in an authorized playback environment, such as in aircraft for example, the ambient conditions prevailing are not ideal. During playback of the data content there are therefore disruptions to the playback environment, for example by background noises, a level of sound in the playback environment, etc. As a result of this fact, which is used by the embodiments described herein, the data content and in such cases, above all the audio component, can be manipulated such that for an authorized playback of the data content in the authorized playback environment no quality reductions occur. The interference signal is thus not perceived or at least not perceived as disruptive in this playback environment by the user because of the background noises. With a copy of the data content—particularly when played back in an ideal playback environment (e.g. in a home cinema, etc.)—the interference signal has a marked effect on the quality of the data content. This makes the copy of the data content unusable. The data content is additionally protected by the interference signal in a simple manner and without any great additional expense or protection of the data content is improved.

The interference signal may be inserted before the data content is played back on the entertainment system or before it is transmitted to the respective output unit or before the data content is played back on the respective output unit. This enables data content to be additionally protected in a simple and flexible manner In such cases it is of no consequence for example whether the data content is already on the entertainment system or is only being played through it. The insertion of the interference signal can be adapted very simply to the respective circumstances.

The interference signal may be added to an audio component of the data content. Such manipulation of the data content—i.e. an insertion of an interference signal which is mixed into the audio component (e.g. audio data content, audio track of video data content) of the data content—can be done in various ways. Noise can be used as the interference signal which "cloaks" the audio components of the data content as a disruption. Insertion of noise can for example be referred to as a passive audio noise cloak. Because of the constant background noises in the authorized playback environment (e.g. inside an aircraft) the noise is (subjectively) not perceivable. In a quiet environment, such as in a home cinema for example, a permanent disruption in the reproduction of the data content is caused by the noise.

However it is useful for a mixed signal to be used as the interference signal. In this case noise is mixed with a phase-shifted interruption noise of the authorized playback environment and then added to the data content as the interruption signal. This means that the mixing in of an interruption signal to the data content is combined with active noise reduction technologies. One option for active noise reduction in reproduction of data content is for example the use of a phase-shifted interference noise. This for example enables a significant reduction of interference by ambient noise and/or sounds (e.g. noise of aircraft engines, etc.) in a loud environment. With active noise reduction this is for example carried out by injecting corresponding noises directly via headphones, e.g. microphones in the headphones, etc.) or in enclosed spaces also explicitly by a number of microphones, loudspeakers, etc. from which anti-phase waves are generated.

The combination of the interference signal or noise with a phase-shifted interference noise of the authorized playback environment (e.g. real noise of an aircraft, background noise of the aircraft engines, background noise of a moving train, etc.) enables the effect that during playback of the data content in the authorized playback environment interference or the interference signal is subjectively perceived but in another playback environment has a destructive effect, is increased even further. Through an additional use of the phase-shifted interference noise from the authorized playback environment an improvement in the playback quality, especially in the audio quality is achieved in the authorized playback environment. In another environment or when playing back a copy of the data content there is a significant deterioration in the playback quality which makes this unusable.

One of the embodiments makes provision for an interior of a means of personal transportation, especially an aircraft, to be provided as the authorized playback environment for the data content. Thus high-quality data content which is offered for example in a means of personal transport such as an aircraft in a hospitality window can be protected in a very simple manner. Above all the fact that specific and uniquely identifiable background noises (e.g. aircraft engines, etc.) are present in means of passenger transport can be exploited, which can then be combined very simply with noise into an interference signal.

According to one embodiment, there is provision for a mobile terminal of a user, especially a smart phone, tablet PC etc. or a personal entertainment device to be used as the output unit. This enables any given terminals to be used user-specifically and flexibly as output units, without for example authorizations and/or rights to high-quality data content being violated. The interference signal added to the data content for example makes the copying of the data content pointless since the data content, when played back outside the authorized playback environment, cannot be played back without interference.

BRIEF DESCRIPTION OF THE DRAWING

Embodiments will be illustrated below by way of example with reference to the enclosed FIG. 1. FIG. 1 is an exemplary and schematic diagram of a sequence of a method for protecting data content.

DETAILED DESCRIPTION OF INVENTION

FIG. 1 is a schematic diagram showing an example of an authorized playback environment ASU, such as the inside of a passenger transport means, especially an aircraft, a train, etc. An entertainment system US is provided in this authorized playback environment ASU. With the entertainment system US users, e.g. passengers of the means of passenger transport can be provided with data content DI, especially audio data content and/or video data content, e.g. as an entertainment program. This data content DI is for example audio and/or video data content such as films, music clips, series etc. which is made available for example to an operator of the means of passenger transport in a hospitality window—i.e. before it appears on the market, on DVD for example.

Output units AE1, AE2, . . . , AEn are provided in the authorized playback environment ASU for output, retrieval by a user and playback of the data content DI. These output units AE1, AE2, . . . , AEn are linked via a distribution device A to the entertainment system US, wherein the data content DI is transported via this distribution device A from the entertainment system US to the output units AE1, AE2, . . . , AEn. Permanently installed screens can be provided for example in the authorized playback environment ASU as output units AE1, AE2, . . . , AEn, which are connected for example via cabling as the distribution device A to the entertainment system US.

However it is also possible for the output units AE1, AE2, . . . , AEn to be embodied as what are known as personal entertainment devices (e.g. smart phone, tablet PC, etc.), which are made available to users or for mobile terminals belonging to the users, such as smart phones, tablet PCs, laptops, etc. to be able to be used as output units AE1, AE2, . . . , AEn for output and playback of the data content DI. In this case a radio communication systems, such as WirelessLAN, GSM, UMTS, GSM-on-board etc. can be used as the distribution device A for transmission of the data content DI for example.

If for example the entertainment system US is put into operation once the means of passenger transport with the authorized playback environment ASU has been started, in a first method step 1 data content DI is made available by the entertainment system US. This data content DI can for example be retrieved and output via selection on the output units AE1, AE2, . . . , AEn located in the authorized playback environment. In this case in a second method step 2 an interference signal SG is added to the data content DI such that when the data content DI is played back outside the authorized playback environment ASU interference and/or a marked reduction in quality of the data content DI is brought about. I.e. reproduction of the data content DI in an unauthorized environment is permanently and clearly disrupted by the interference signal SG.

The interference signal SG can in such cases be mixed into the data content DI before the transport or transmission of the data content to the output units AE1, AE2, . . . , AEn on the entertainment system US. As an alternative the interference signal SG can for example also be added to the data content during or before the data content DI is played back on the entertainment system US. Furthermore there is the option of only adding the interference signal SG to the data content DI in the output units AE1, AE2, . . . , AEn.

The interference signal SG, which is added for example in the second method step 2 before the transmission of the data content DI, is ideally mixed into an audio component of the data content DI. In such cases noise can be used as an interference signal SG for example. This noise SG is not perceived (subjectively) in the authorized playback environment ASU as a result of existing background noises (e.g. aircraft noises, etc.) or a level of sound. In a quiet environment such as a home cinema for example, permanent interference is generated during the reproduction of the data content DI by the noise SG. The data content DI or the audio component of the data content DI is "cloaked" by the noise SG as interference signal SG, which is why this can also be referred to as passive audio noise cloaking.

As an alternative the noise signal SG used or the passive audio noise cloaking can be combined with active noise reduction technologies. In this case, for interference signals SG in the authorized playback environment ASU existing or known background and/or interference noises are taken into account. This means that a combination of a noise and a phase-shifted interference noise of the authorized playback environment ASU is used as the interference signal SG (i.e. a phase shifted real noise through which a phase cancellation with the existing interference noises is brought about). The effect of such a combination is that on the one hand an improvement in the playback quality of the data content DI, especially of the audio component, is achieved in the authorized playback environment ASU. On the other hand in a non-authorized playback environment the result is a significant worsening of the playback quality of the data content DI, which means that the copy and/or further copies of the data content DI are of no interest.

Active noise reduction technologies currently enable especially low-frequency background or interference noises to be successfully reduced for example since with high-frequency sound waves a distance between a sound source and the inner ear of the user is too large to effect an exact phase cancellation of the two phase-shifted noises. In addition with short waves a distance between a microphone and the sound source or the headphones must also be relatively short. Since however for example in means of passenger transport such as aircraft, low-frequency interference noises—for example in a frequency range of approximately 50 to 600 Hz—arise, the combination of interference signal SG or noise SG with an active noise or interference noise reduction technology can be used to improve the playback quality of the data content DI e.g. in an aircraft as well as for a further protection of the data content DI (e.g. from unauthorized copying, filming, etc.). This combination can also be referred to as active audio noise cloaking.

After an addition of an interference signal SG in the second method step 2, the data content is then forwarded in a third method step 3 by the distribution device A to the output units AE1, AE2, . . . , AEn. In a fourth method step 4 the data content DI can then be output and played back on the output units AE1, AE2, . . . , AEn.

A mixing or addition of an interference signal SG into the data content DI, especially to the audio component or to an audio track of the data content DI, is therefore above all also relevant because, according to the Motion Picture Association of America approximately 90% of unauthorized copying of data content DI, especially of video data content, by filming the data content, is undertaken by means of cameras, camcorders, copying software etc. It is precisely during transmission and playback of the data content DI however on so-called personal entertainment devices or mobile terminals of a user that the illustrated method can very simply and quickly and also at no great expense, combine an additional interference signal SG (e.g. conversation noises, background noise etc.) with existing data content DI, so that an unauthorized copy exhibits greatly reduced quality and disruptions. This copy is thus worthless and of no interest.

Thus with the illustrated method, an additional protection—as well as conventional protection mechanisms—can be achieved for data content DI, especially on playback in means of passenger transport such as aircraft for example. Especially in the variant of what is known as active audio noise cloak or audio noise cloaking (equals a combination of noise and a phase-shifted interference noise of the authorized playback environment ASU into an interference signal SG) on the one hand an improvement of the playback quality in an authorized playback environment ASU (e.g. aircraft, etc.) can be achieved while on the other hand, in other playback environments, which for example access an illegally created copy, etc. a significant deterioration of the playback quality occurs.

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the term "comprising" does not exclude other elements or steps and the use of articles "a" or "an" does not exclude a plurality.

The invention claimed is:

1. A method for protecting data content against illegal copying, wherein the data content is provided by an entertainment system and is output to output units in an authorized playback environment for playing back the data content, the method comprising:
    transmitting the data content in the authorized playback environment, wherein the interior of an aircraft is provided as the authorized playback environment, from the entertainment system to an output unit, and
    adding an interference signal to the data content,
    wherein noise is added as the interference signal comprising a passive audio noise cloak and a phase shifted interruption noise based on specific and identifiable background noises in the authorized playback environment,
    wherein the passive audio noise cloak is configured such that the noise is not subjectively perceivable in the authorized playback environment due to constant background noises in the authorized playback environment and the phase shifted interruption noise is adapted to enable significant reduction of interference by the specific and identifiable background noises in the authorized playback environment;
    wherein the interference signal is specifically adapted to ambient conditions in the authorized playback environment and is configured such that during playback of the data content outside the authorized playback environment a perceivable disruption is induced by the passive audio noise cloak and phase shifted interruption noise, which is not perceivable during the playback of the data content inside the authorized playback environment because of the background noises of the authorized playback environment.

2. The method as claimed in claim 1, wherein the interference signal is added before playback of the data content on the entertainment system.

3. The method as claimed in claim 1, wherein the interference signal is added before a transmission of the data content to the output unit.

4. The method as claimed in claim 1, wherein the interference signal is added before playback by the output unit.

5. The method as claimed in claim 1, wherein the interference signal is added to an audio component of the data content.

6. The method as claimed in claim 1, wherein noise is added as the interference signal.

7. The method as claimed in claim 6, further comprising:
    mixing the noise with a phase-shifted interference noise of the authorized playback environment, and
    adding the noise mixed with the phase-shifted interference noise to the data content as the interference signal.

8. The method as claimed in claim 1, wherein a mobile terminal is used as the output unit.

9. The method according to claim 1, wherein a personal entertainment device is used as the output unit.

10. The method according to claim 1, wherein audio and/or video data content is used as said data content.

* * * * *